(12) United States Patent
Kim et al.

(10) Patent No.: US 8,272,259 B2
(45) Date of Patent: Sep. 25, 2012

(54) COMPACT WIND TUNNEL INSTRUMENT

(75) Inventors: Hyun-Goo Kim, Daejeon (KR); Hyung-Ki Shin, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 7 days.

(21) Appl. No.: 12/900,299

(22) Filed: Oct. 7, 2010

(65) Prior Publication Data

US 2011/0100109 A1 May 5, 2011

(30) Foreign Application Priority Data

Oct. 29, 2009 (KR) .................. 10-2009-0103729

(51) Int. Cl.
*G01M 9/00* (2006.01)
(52) U.S. Cl. .......................................... 73/147
(58) Field of Classification Search .......... None
See application file for complete search history.

(56) References Cited

U.S. PATENT DOCUMENTS

| 5,734,202 | A | * | 3/1998 | Shuler | 290/55 |
| 6,083,110 | A | * | 7/2000 | Kitchen et al. | 472/49 |
| 6,748,800 | B2 | * | 6/2004 | Lacey, Jr. | 73/147 |
| 6,820,477 | B2 | * | 11/2004 | Markstaller et al. | 73/147 |
| 7,107,831 | B2 | * | 9/2006 | Markstaller et al. | 73/147 |
| 7,156,744 | B2 | * | 1/2007 | Metni et al. | 472/50 |

FOREIGN PATENT DOCUMENTS

JP 06137991 A * 5/1994

* cited by examiner

*Primary Examiner* — Lisa Caputo
*Assistant Examiner* — Jermaine Jenkins
(74) *Attorney, Agent, or Firm* — The Webb Law Firm

(57) ABSTRACT

Provided is a compact wind tunnel instrument. The compact wind tunnel instrument includes a blowing unit configured by a plurality of blowing devices provided in the same plane, and a control unit for controlling them, thereby easily providing a variety of wind environments.

3 Claims, 5 Drawing Sheets

[Fig. 1]
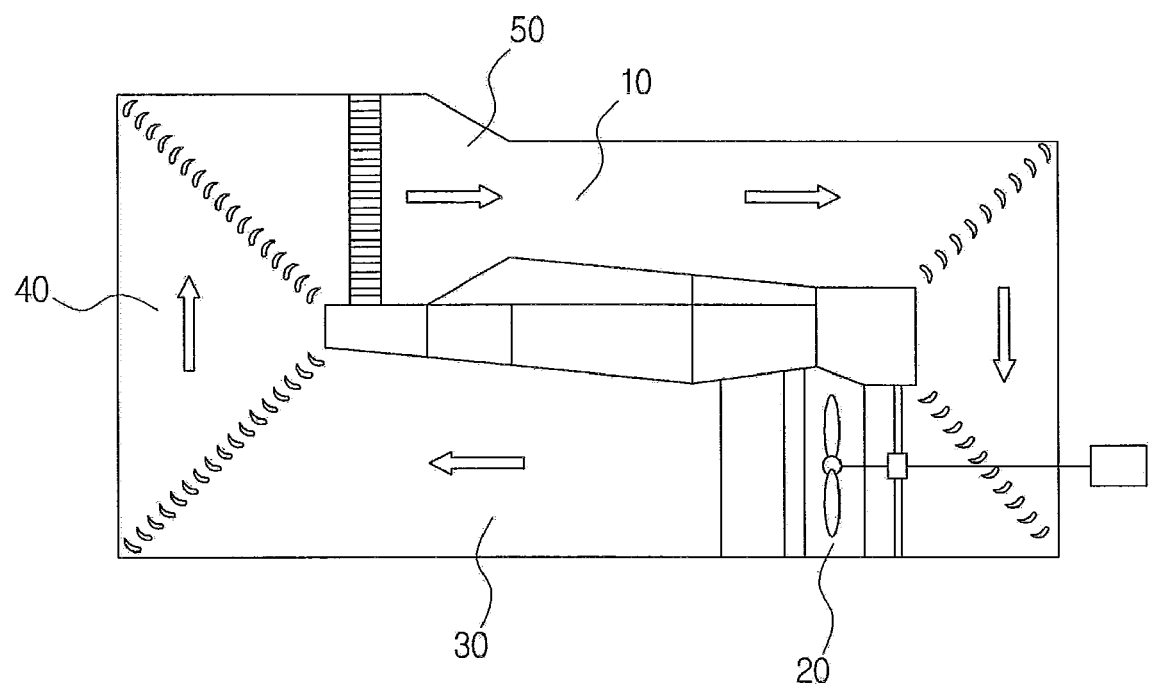

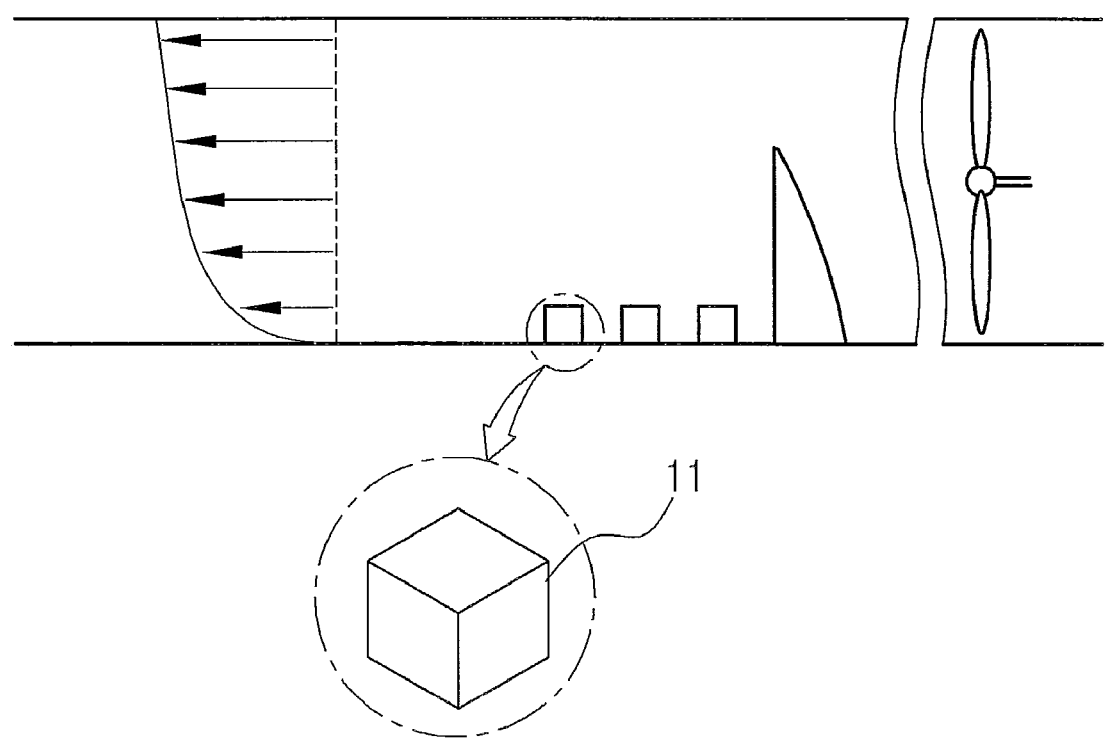
[Fig. 2]

[Fig. 3]
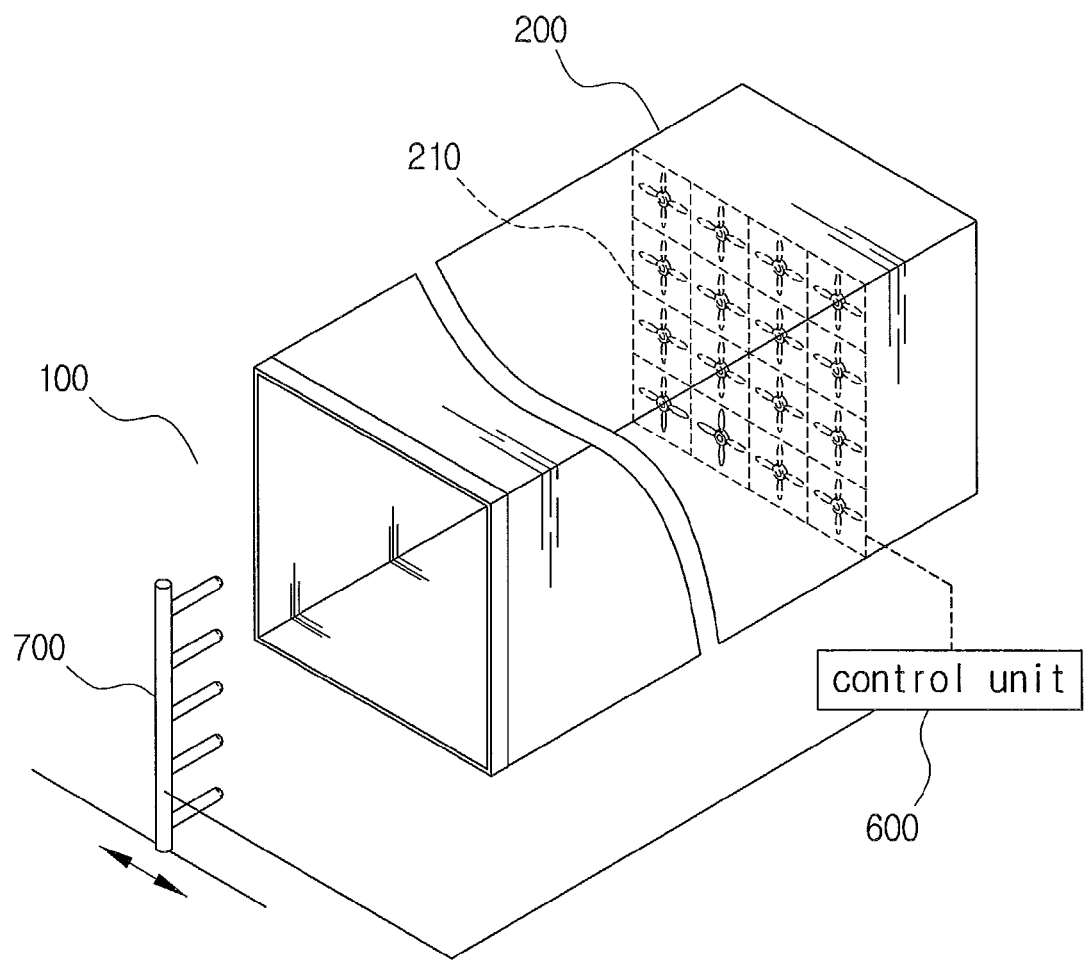

[Fig. 4]
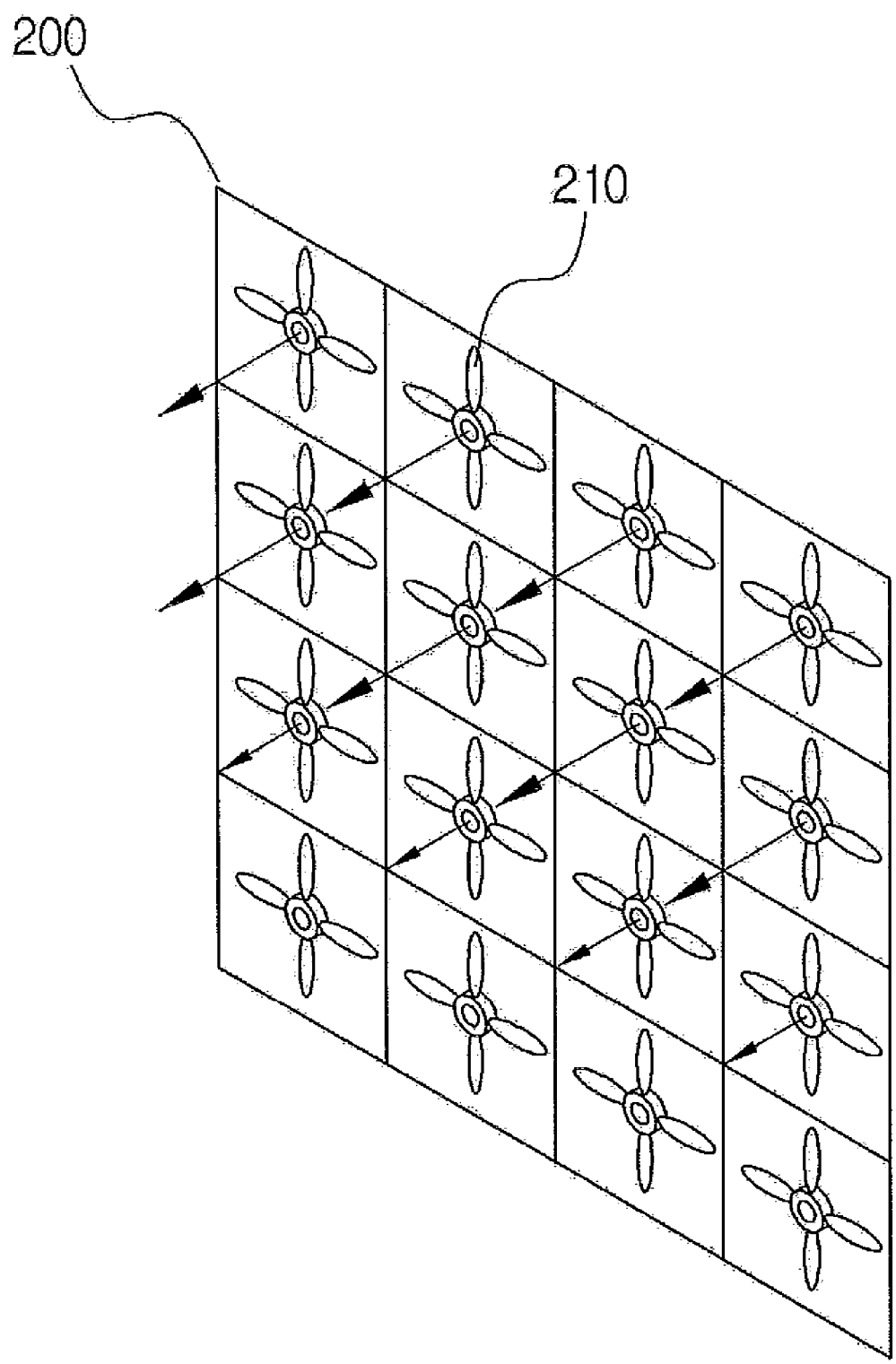

【Fig. 5】
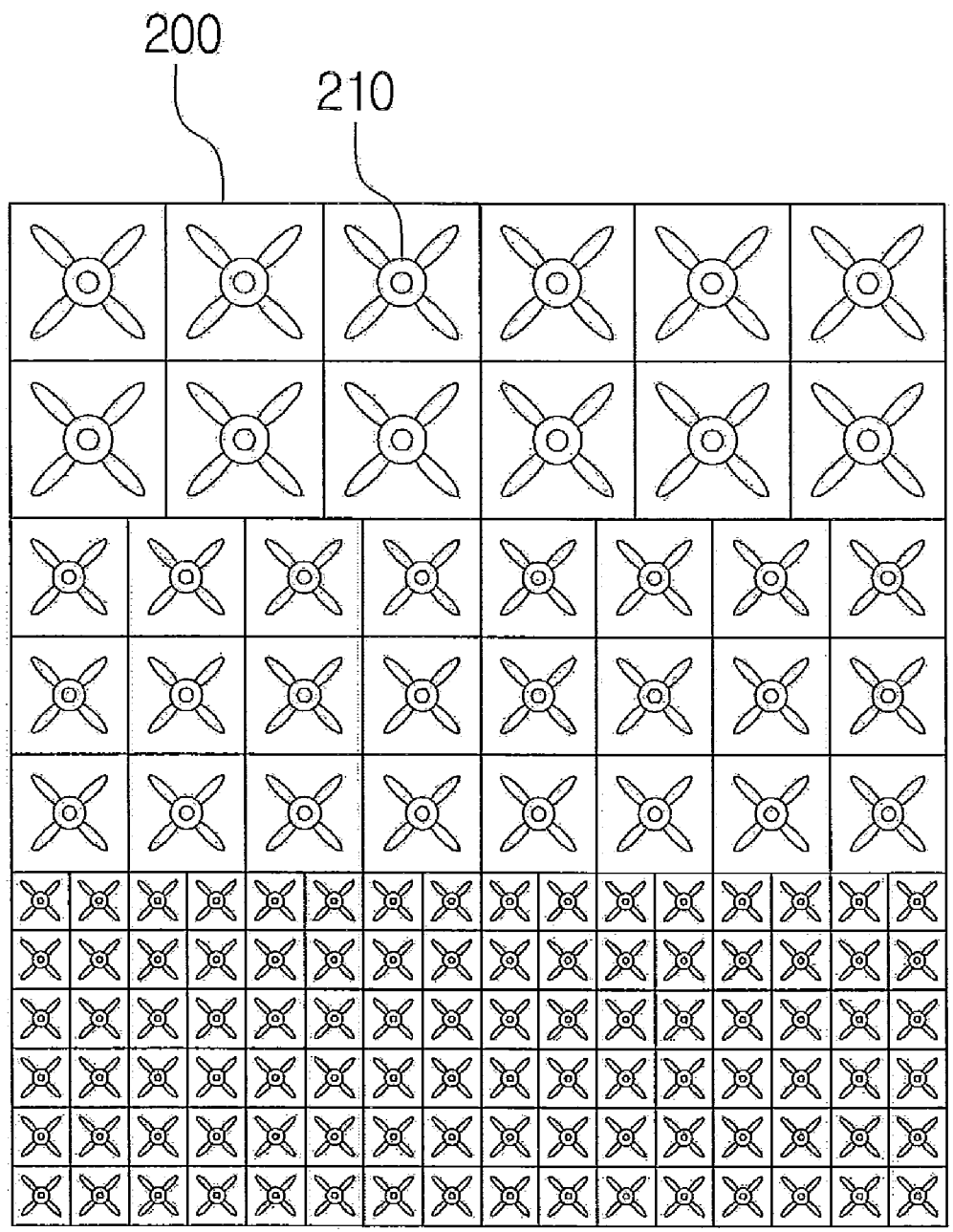

COMPACT WIND TUNNEL INSTRUMENT

TECHNICAL FIELD

The present invention relates to a compact wind tunnel instrument. Specifically a compact wind tunnel instrument having a simple configuration is provided instead of a complex and large wind tunnel structure. Various types of wind distributions can be created by controlling a plurality of blowing devices arranged in the same plane of a blowing unit without construction of long ground surface environment in front of a test unit.

BACKGROUND ART

Wind environment researches have been performed for analyzing a diffusion status of exhaust gas from a factory, or for analyzing air currents around buildings in the vicinity of a large structure such as a bridge or a building before constructing the structure for the prediction of wind damage and countermeasures against the damage. For the research, a method of performing measurement in an actual site has been used. However, in terms of cost, a method of performing analysis through a wind tunnel test using a scale model of geographical features is widely used.

The wind tunnel instrument is classified into a closed-circuit type and an open-circuit type. The closed-circuit type has less power loss but requires a large space and high cost. So, it is suitable for a high-quality experiment with high wind velocity and low turbulence. The open-circuit type has an advantage of a small space and low installation cost, however, has high power loss. So, it is suitable for a low-quality experiment with low wind velocity and high turbulence on constructions and buildings.

FIG. 1 illustrates an example of the closed-circuit wind tunnel instrument, but the open-circuit wind tunnel instrument is also configured similarly. The close-circuit wind tunnel instrument includes: a blower 20 for blowing wind; a diffuser 30 which has an increased cross-section to decrease a velocity of air current from the blower 20 thereby enhancing a rectifying function of a settling chamber; a settling chamber 40 for decreasing a turbulence strength and suppressing a velocity component in an axial direction through a rectification lattice; a contraction 50 which has a decreased cross-section to increase velocity and form uniform air current with constant pressure and velocity; a test unit 10 for performing various measurements; and other measurement devices and a controlling device.

A vertical profile of wind blowing on an actual ground surface is changed according to a roughness of the ground surface (surface roughness) and height as shown in the following boundary layer equation. Trees and buildings existing on the actual ground surface increase the surface roughness of the ground surface, and the wind blowing on the actual ground surface has a relatively smaller velocity than that blowing at a higher position as shown by a vertical profile illustrated in FIG. 2.

$$u = \frac{u^*}{k} \ln\left(\frac{z}{z_0}\right) \quad \text{[Equation 1]}$$

where
$u^*$: friction velocity,
k: Von Kámán constant, and
$z_0$: roughness height.

In order to provide an environment similar to the actual geographical features, the wind tunnel instrument is given a roughness for the ground surface by installing an arbitrary standing object 11 as illustrated in FIG. 2.

However, in this method, in order to create the boundary layer, a large section including the standing object 11 has to be provided on a front portion of the test unit 10. In addition, since the ground surface condition changes whenever a new wind experiment research is needed, there is a problem in that the test unit of the wind tunnel instrument has to be newly constructed. Furthermore, there is a problem in that large space and high costs are needed.

Also, there are many difficulties in the existing method to form an exact shape of a wind profile desired by the experimenter.

DISCLOSURE

Technical Problem

An object of the present invention is to provide a compact wind tunnel instrument capable of easily and exactly providing a variety of wind environments, the wind environment created in the wind tunnel instrument being precisely controllable.

Another object of the present invention is to provide a manual containing control results of tests along with the wind tunnel instrument for utilization of a compact wind tunnel instrument capable of providing a variety of wind environments at low cost.

Technical Solution

To achieve the object of the present invention, the present invention provides a compact wind tunnel instrument including: a blowing unit for generating wind; and a test unit provided in front of the blowing unit, wherein the blowing unit is configured by a plurality of blowing devices provided in the same plane.

The compact wind tunnel instrument may further include a control unit for controlling individual operations of the plurality of the blowing devices to generate a desired wind distribution.

The test unit may include a detection unit for detecting a wind distribution generated by the blowing unit.

In addition, in order to exactly description a wind profile having a gradient which becomes sharp as it goes downward as shown in FIG. 2, the number of blowing devices of the blowing unit per unit area may be increased in a downward direction.

Advantageous Effects

A spatial problem due to a long section for manufacturing a ground surface environment for a test unit is solved, and problems in terms of time and cost in that a different ground surface environment has to be constructed for each case are solved. Also, it is possible to form an exact shape of a wind profile desired by the experimenter, which has been difficult to be achieved by an existing apparatus. In the wind tunnel instrument according to the present invention, by controlling the blowing unit instead, a predictable wind environment can be formed simply.

A variety of wind environments controlled in advance can be provided by supplying the wind tunnel instrument having a small size at low costs.

A wind velocity detection unit may be provided in the test unit to cooperate with the control unit for controlling the blowing unit to feed a current wind velocity distribution back to the control unit, thereby precisely controlling the wind environment.

DESCRIPTION OF DRAWINGS

The above and other objects, features and advantages of the present invention will become apparent from the following description of preferred embodiments given in conjunction with the accompanying drawings.

FIG. 1 is a view illustrating a configuration of a general wind tunnel instrument.

FIG. 2 is a view illustrating a test unit of the wind tunnel instrument which is given roughness for a ground surface and a vertical profile of wind velocity.

FIG. 3 is a view illustrating a configuration of a compact wind tunnel instrument according to an embodiment.

FIG. 4 is a view illustrating an example of a blowing unit of FIG. 3.

FIG. 5 is a view illustrating another example of the blowing unit of FIG. 3.

BEST MODE

Hereinafter, a compact wind tunnel instrument according to an embodiment will be described in detail with reference to the accompanying drawings.

FIG. 3 is a view illustrating a configuration of the compact wind tunnel instrument according to an embodiment, and FIGS. 4 and 5 are views illustrating other configurations for operating a blowing unit 200.

A compact wind tunnel instrument according to the present invention includes a blowing unit 200 for generating wind and a test unit 100 provided in front of the blowing unit 200. A diffuser, a settling chamber, and a contraction, which are included in an existing wind tunnel instrument, may also be included as illustrated in FIG. 1. However, in order to achieve a decrease in size, the compact wind tunnel instrument according to the present invention is configured to be able to provide a desired wind distribution even without such components.

In the present invention, the blowing unit 200 is configured by a plurality of blowing devices 210 provided in the same plane. As an example of the blowing unit, the blowing unit 200 configured by arranging a plurality of fans as the blowing devices 210 in a left and right directions or in an up and down direction in the same plane is illustrated in FIG. 4. The number of blowing devices per unit area is not particularly limited. In this embodiment, a case where the number is uniform is illustrated. Through the configuration of the blowing unit 200 configured by a plurality of the blowing devices, air current with low velocity can be generated. Of course, through an additional design, the configuration may be applied to the generation of air current with high velocity.

In a case where a vertical profile of wind is to be generated in consideration of surface roughness of a ground surface as illustrated in FIG. 2, unlike the existing configuration in which miniature models are provided in a large wind tunnel instrument, the compact wind tunnel instrument according to this embodiment generates a vertical profile of wind by allowing a control unit 600 to control the operation of each of the blowing devices 210. A plurality of the blowing devices 210 may be provided if needed, and as the number is increased, more precise and various control operations are possible.

For example, as illustrated in FIG. 4, when the operations of the fans at the lowest line are stopped and the fans are allowed to increase their rpm so as to blow stronger wind in an upward direction, in the test unit 100, a wind profile which is similar to the vertical profile of wind considering surface roughness of the actual ground surface may be formed.

In this manner, when the operations of the fans in the up, down, left, and right directions are individually adjusted, a variety of types of wind distributions can be easily created, and it is possible to easily provide various wind environments.

FIG. 5 illustrates another example in which the blowing unit 200 is configured by arranging a plurality of the blowing devices 210 in the same plane so that the number of blowing devices per unit area increases in a downward direction unlike the above-mentioned example. In actual wind environment, a variety of wind environments are generated near the ground surface due to trees and buildings. On the contrary, high above the ground surface, a change in wind environment is relatively small. From this point of view, in this example, a plurality of the blowing devices 210 are provided and a larger number of the blowing devices 210 is provided in the downward direction so as to allow precise control of various types of wind environments.

The compact wind tunnel instrument according to the embodiment may further include a detection unit 700 for detecting the wind distribution generated by the blowing unit 200. Since the detection unit 700 is for detecting the wind distribution generated by the control operation, the configuration thereof is not particularly limited, but various types of exiting anemometers may be used. FIG. 3 illustrates an example in which the wind distribution generated by the test unit 100 is detected by horizontally moving a hot-wire anemometer having a plurality of hot wires arranged in the up and down direction.

The detection unit 700 checks whether or not a desired wind distribution is generated, and may feed the detection result back to the control unit 600 in real time to generate the desired wind distribution.

Since the present invention aims at providing a compact wind tunnel instrument, a wind tunnel instrument having a very simple configuration without the detection unit 700 may be provided. In this case, a manual containing wind distributions according to the detection results and control methods thereof may be provided in advance so as to allow a simple operation to be performed with reference to the manual to generate a wind distribution.

While the present invention has been described with respect to the specific embodiments, it will be apparent to those skilled in the art that various changes and modifications may be made without departing from the spirit and scope of the invention as defined in the following claims.

The invention claimed is:

1. A compact wind tunnel instrument comprising: a blowing unit for generating wind; and a test unit provided in front of the blowing unit, wherein the blowing unit is configured by a plurality of blowing devices provided in the same plane and the number of blowing devices of the blowing unit per unit area is increased in a downward direction.

2. The compact wind tunnel instrument according to claim 1, further comprising: a control unit for controlling individual operations of the plurality of the blowing devices to generate a desired wind distribution.

3. The compact wind tunnel instrument according to claim 1, wherein the test unit comprises a detection unit for detecting a wind distribution generated by the blowing unit.

* * * * *